United States Patent
Li et al.

(10) Patent No.: US 8,269,467 B2
(45) Date of Patent: Sep. 18, 2012

(54) DUAL-MODE CHARGER CIRCUIT

(75) Inventors: Rong Li, Shanghai (CN); Feng-Chang Yan, Shanghai (CN); Jian-Jun Liu, Shanghai (CN)

(73) Assignees: Ambit Microsystems (Shanghai) Ltd., Shanghai (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 354 days.

(21) Appl. No.: 12/685,885

(22) Filed: Jan. 12, 2010

(65) Prior Publication Data

US 2011/0133701 A1 Jun. 9, 2011

(30) Foreign Application Priority Data

Dec. 3, 2009 (CN) .................... 2009 2 0316425 U

(51) Int. Cl.
*H02J 7/04* (2006.01)
*H02J 7/00* (2006.01)
(52) U.S. Cl. ........ 320/153; 320/154; 320/158; 320/160; 323/907
(58) Field of Classification Search .................... 320/153
See application file for complete search history.

(56) References Cited

U.S. PATENT DOCUMENTS

| | | | | | |
|---|---|---|---|---|---|
| 4,090,122 | A | * | 5/1978 | Hoinski | 320/125 |
| 4,712,055 | A | * | 12/1987 | Houser, Jr. | 320/144 |
| 5,136,231 | A | * | 8/1992 | Faulk | 320/134 |
| 5,254,931 | A | * | 10/1993 | Martensson | 320/114 |
| 5,568,039 | A | * | 10/1996 | Fernandez | 320/150 |
| 5,744,937 | A | * | 4/1998 | Cheon | 320/125 |
| 6,034,504 | A | * | 3/2000 | Holcomb | 320/110 |
| 6,169,341 | B1 | * | 1/2001 | Nagai | 307/82 |
| 6,184,659 | B1 | * | 2/2001 | Darmawaskita | 320/139 |
| 2008/0036425 | A1 | * | 2/2008 | Tashiro et al. | 320/154 |

* cited by examiner

*Primary Examiner* — Yalkew Fantu
(74) *Attorney, Agent, or Firm* — Altis Law Group, Inc.

(57) ABSTRACT

A dual-mode charger circuit includes a first charge circuit and a second charge circuit connected in parallel between a power source and a battery, to charge the battery under a slow charge mode and a quick charge mode. A central processing unit detects a capacity of the battery and determines whether the detected capacity exceeds a predetermined capacity, and outputs a mode control signal according to the determination. A mode switch circuit switches the second charger circuit on/off according to the mode control signal. When the second charge circuit is off, the battery is charged under the slow charge mode, and when the second charge circuit is on, the battery is charged under the quick charge mode.

10 Claims, 2 Drawing Sheets

DUAL-MODE CHARGER CIRCUIT

BACKGROUND

1. Technical Field

The present disclosure relates to a dual-mode charger circuit.

2. Description of Related Art

Portable devices, such as cordless phones and mobile phones, for example, utilize integrated circuits (ICs) to perform charge and protection functions. These ICs are generally expensive especially in mass quantities.

DETAILED DESCRIPTION

Figure 1:
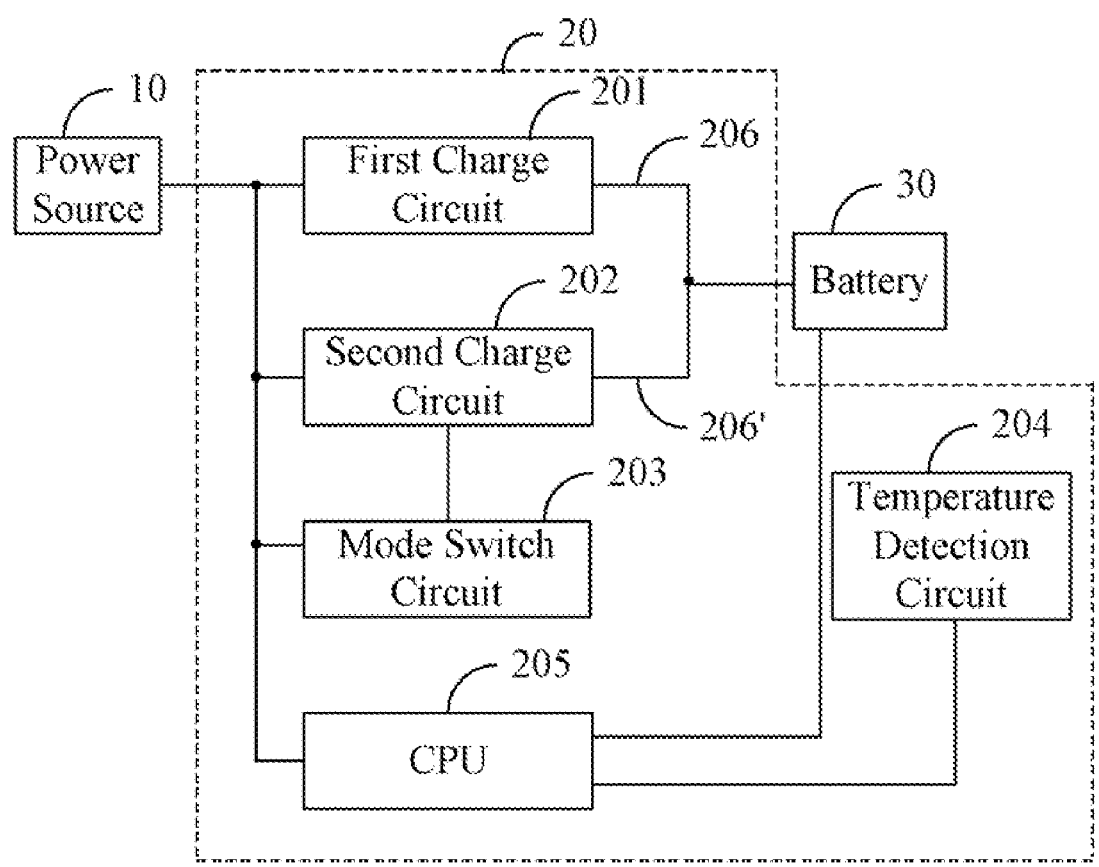
FIG. 1 is a block diagram of one embodiment of a dual-mode charger circuit.

FIG. 1 is a block diagram of one embodiment of a dual-mode charger circuit 20. The dual-mode charger circuit 20 may be used to charge a battery 30 of a portable mobile device (not shown), such as a cordless phone, a mobile phone, for example. The dual-mode charger circuit 20 comprises a first charge circuit 201, a second charge circuit 202, a mode switch circuit 203, a temperature detection circuit 204 and a central processing unit (CPU) 205.

The first charge circuit 201 and the second charge circuit 202 are connected in parallel between a power source 10 and the battery 30, to provide a first charge path 206 and a second charge path 206'. In one embodiment, the battery 30 may be slowly charged only through the first charge path 206, which is defined as a slow charge mode of the dual-mode charger circuit 20. In another embodiment, the battery 30 may be charged quickly through both the first charge path 206 and the second charge path 206', which is defined as a quick charge mode of the dual-mode charger circuit 20.

The CPU 205 is connected to the battery 30, to detect a capacity of the battery 30 and determine whether the detected capacity exceeds a predetermined capacity, such as 80% of the battery 30 being fully charged, and output a mode control signal according to the determination. The mode switch circuit 203 is connected between the CPU 205 and the second charge circuit 202, to switch the second charger circuit 202 on/off according to the mode control signal. At the same time, the mode switch circuit 203 is also connected to the power source 10.

The temperature detection circuit 204 is connected to the CPU 205, to detect a temperature of the battery 30 and output to the CPU 205. Thus, the CPU 205 outputs a temperature protection signal according to the detected temperature, and also switches the second charge circuit 202 on/off.

In one embodiment, when the dual-mode charger circuit 20 starts to charge the battery 30, the CPU 205 detects the capacity of the battery 30. If the detected capacity does not exceed the predetermined capacity, the CPU 205 outputs a high level signal, such as 3.3V, to the mode switch circuit 203. Thus, the mode switch circuit 203 switches the second charge circuit 202 on, and the battery 30 is charged through both the first charge path 206 and the second charge path 206' under the quick charge mode accordingly. If the detected capacity exceeds the predetermined capacity, the CPU 205 outputs a low level signal, such as 0V, to the mode switch circuit 203. Thus, the mode switch circuit 203 switches the second charge circuit 202 off, and the battery 30 is charged only through the first charge path 206 under the slow charge mode accordingly.

Similarly, the temperature detection circuit 204 detects a temperature of the battery 30 and outputs to the CPU 205. The CPU 205 determines whether the detected temperature exceeds a predetermined value and outputs a temperature protection signal. In one embodiment, the temperature protection signal is also a high level signal or a low level signal, which controls the mode switch circuit 203 to switch the second charge circuit 202 on/off.

In other words, if the detected temperature of the battery 30 exceeds the predetermined value, the CPU 205 outputs a low level signal of the temperature protection signal to the mode switch circuit 203. Thus, the second charge circuit 202 is off, and the battery 30 is charged under the slow charge mode in order to achieve temperature protection function. In contrast, if the temperature of the battery 30 does not exceed the predetermined value, the CPU 205 outputs a high level signal of the temperature protection signal to the mode switch circuit 203. Thus, the second charge circuit 202 is on, and the battery 30 is also charged under the quick charge mode.

It should be understood that as battery 30 is being charged by the dual-mode charger circuit 20, the first charge circuit 201 always switches on. Thus, the battery 30 is charged under the slow charge mode consistently. However, the second charge circuit 202 is switched on/off based on the capacity and the temperature of the battery 30. That is, the dual-mode charger circuit 20 determines whether battery 30 is charged under the quick charge mode based on the battery capacity or the temperature of the battery 30.

Figure 2:
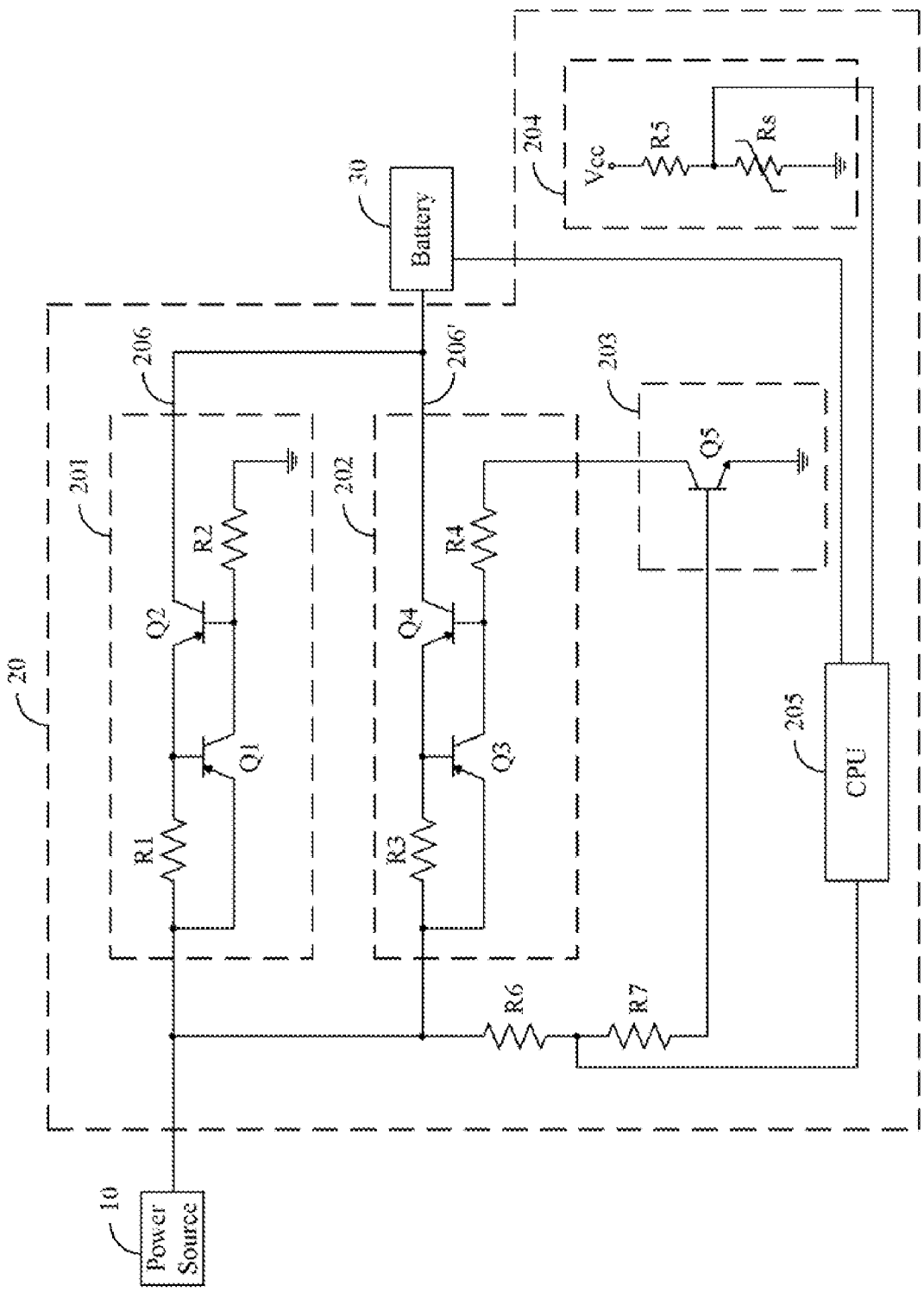
FIG. 2 is a detailed circuit diagram of the dual-mode charger circuit of FIG. 1.

FIG. 2 is a detailed circuit diagram of the dual-mode charger circuit 20 of FIG. 1. The first charge circuit 201 comprises a first resistor R1, a first transistor Q1, a second transistor Q2 and a second resistor R2. The first transistor Q1 has a control end connected to the power source 10 via the first resistor R1, and a first output connected to the power source 10 directly. The second transistor Q2 has a control end connected to a second output of the first transistor Q1, a first output connected to the control end of the first transistor Q1, and a second output connected to the battery 30. The second resistor R2 is connected to the control end of the second transistor Q2 and ground. In one embodiment, the second transistor Q2 and the second resistor R2 form a bias circuit, to provide a bias voltage to the first transistor Q1 in order to keep the first transistor Q1 on. The first resistor R1 limits current flowing through the first charge path 206. The first transistor Q1 and the second transistor Q2 are pnp transistors, each having a base defined as the control end, an emitter defined as the first output and a collector defined as the second output.

Structures of the second charge circuit 202 are substantially the same as those of the first charge circuit 201, which also comprises a first resistor R3, a first transistor Q3, a second transistor Q4 and a second resistor R4, thus, description thereof is omitted. The only difference is that the second resistor R4 is connected between the control end of the second transistor Q4 and mode switch circuit 203 in the second charge circuit 202.

The mode switch circuit 203 comprises a third transistor Q5. The third transistor Q5 has a control end connected to the CPU 205, a first output grounded and a second output connected to the second resistor R4 of the second charge circuit 202, and is switched on/off based on the mode control signal. Accordingly, the first transistor Q3 and the second transistor Q4 in the second charge circuit 202 can be also switched on/off. In one embodiment, the third transistor Q5 is an npn transistor, which has a base defined as the control end, an emitter defined as the first output and a collector defined as the second output.

The temperature detection circuit 204 comprises a third resistor R5 and a temperature detection resistor Rs connected in series between a power source Vcc and ground, and a junction of the third resistor R5 and the temperature detection resistor Rs is connected to the CPU 205. In one embodiment, the temperature detection resistor Rs is disposed close to the battery 30 to detect a temperature variation of the battery 30 and output to the CPU 205. The temperature detection resistor Rs is a thermal resistor.

In one embodiment, when the dual-mode charger circuit 20 starts to charge the battery 30, the CPU 205 detects the capacity of the battery 30 and outputs the mode control signal. If the detected capacity is lower than the predetermined capacity, the CPU 205 outputs the high level signal. The transistor Q5 is on, and the transistors Q3, Q4 of the second charge circuit 202 are switched on accordingly. Therefore, the battery 30 is charged through both the first charge path 206 and the second charge path 206' under the quick charge mode. If the capacity of the battery 30 is higher than the predetermined capacity, the CPU 205 outputs the low level signal. The transistor Q5 is off, and the transistors Q3, Q4 of the second charge circuit 202 are switched off accordingly. Therefore, the battery 30 is charged only through the first charge path 206 under the slow charge mode.

Similarly, the temperature detection circuit 204 also detects the temperature of the battery 30 and outputs the detected temperature to the CPU 205. Accordingly, the CPU 205 outputs to the temperature protection signal to protect the battery 30.

In one embodiment, because a voltage difference between the base and the emitter of the transistors Q1 or Q3 is about 0.6V, a voltage added to the resistor R1 or R3 is also about 0.6V. Thus, when a short circuit occurs, no inrush current flows through the first charge circuit 201 and the second charge circuit 202. In addition, in order to achieve the quick charge mode resistance of the resistor R3 is smaller than that of the resistor R1, which reduces the current flowing through the first charge circuit 201 below that through the second charge circuit 202.

The mode control signal and the temperature protection signal output from the CPU 205 are often influenced by noise to fluctuate, which leads the transistor Q5 to switch on/off frequently. Consequently, the dual-mode charger circuit 20 lacks stability and components thereof have shortened life. In order to solve above problem, the dual-mode charger circuit 20 further comprises a fourth resistor R6 and a fifth resistor R7. In one embodiment, the fourth resistor R6 and the fifth resistor R7 are connected in series between the power source 10 and the mode switch circuit 203, to divide a voltage of the power source 10. A junction of the fourth resistor R6 and the fifth resistor R7 is connected to the CPU 205 or the temperature detection circuit 204, such that the divided voltage of the power source is added to the mode control signal or the temperature protection signal, which pulls up a direct current level of the mode control signal or the temperature protection signal. Therefore, the transistor Q5 of the switch circuit 203 is controlled more precisely.

In detail, the fourth resistor R6 is connected between the power source 10 and the CPU 205, and the fifth resistor R7 is connected between the CPU 205 and the mode switch circuit 203. When the mode control signal or the temperature protection signal is at high level signal, a signal combining the divided voltage of the power source with the high level signal output from the CPU 205 directs the transistor Q5 of the mode switch circuit 203 to switch on precisely. When the mode control signal or the temperature protection signal is at low level signal, no divided voltage of the fourth resistor R6 and the fifth resistor R7 is combined into the low level signal, thus, the transistor Q5 of the mode switch circuit 203 does not operate.

In the present disclosure, the dual-mode charger circuit 20 utilizes discrete components to achieve charge and protection functions, at a low cost.

Although the features and elements of the present disclosure are described in various inventive embodiment in particular combinations, each feature or element can be configured alone or in various within the principles of the present disclosure to the full extent indicated by the broad general meaning of the terms in which the appended claims are expressed.

What is claimed is:

1. A dual-mode charger circuit to charge a battery, comprising:
   a first charge circuit connected between a power source and the battery, to provide a first charge path;
   a second charge circuit connected in parallel with the first charge circuit, to provide a second charge path;
   a central processing unit connected to the battery, to detect a capacity of the battery and determine whether the detected capacity exceeds a predetermined capacity, and to output a mode control signal according to the determination; and
   a mode switch circuit connected between the central processing unit and the second charger circuit, to switch the second charger circuit on/off according to the mode control signal;
   wherein each of the first and second charge circuits comprises:
   a first resistor;
   a first transistor comprising a control end connected to the power source via the first resistor, and a first output connected to the power source directly;
   a second transistor with a control end connected to a second output of the first transistor, a first output connected to the control end of the first transistor, and a second output connected to the battery; and
   a second resistor connected to the control end of the second transistor;
   wherein the second transistor and the second resistor form a bias circuit of the first transistor, to provide a bias voltage to the first transistor to turn the first transistor on consistently, when the mode switch circuit switches the second charge circuit off, the battery is charged only through the first charge path under a slow charge mode of the dual-mode charger circuit, and when the mode switch circuit switches the second charge circuit on, the battery is charged through both the first charge path and the second charge path under a quick charge mode of the dual-mode charger circuit.

2. The dual-mode charger circuit as claimed in claim 1, wherein the mode switch circuit comprises a third transistor with a control end connected to the central processing unit, a first output grounded and a second output connected to the control end of the second transistor of the second charge circuit via the second resistor of the second charge circuit, to switch the second charger circuit on/off according to the mode control signal.

3. The dual-mode charger circuit as claimed in claim 2, wherein the first transistor and the second transistor of the first charge circuit or the second charge circuit are pnp transistors, and the third transistor of the mode switch circuit is a npn transistor, wherein the control end is a base, the first output is an emitter and the second output is a collector.

4. The dual-mode charger circuit as claimed in claim 1, further comprising a temperature detection circuit connected to the central processing unit, to detect a temperature of the battery and output the result to the central processing unit, wherein the central processing unit outputs a temperature protection signal according to the detected temperature.

5. The dual-mode charger circuit as claimed in claim 4, wherein the temperature protection circuit comprises:
   a third resistor; and
   a temperature detection resistor connected with the third resistor in series between another power source and ground and disposed close to the battery, to detect the temperature of the battery;
   wherein a junction of the third resistor and the temperature detection resistor is connected to the central processing unit.

6. The dual-mode charger circuit as claimed in claim 4, further comprising:
   a fourth resistor; and
   a fifth resistor connected with the fourth resistor in series between the power source and the mode switch circuit, to divide a voltage of the power source;
   wherein a junction of the fourth resistor and the fifth resistor is connected to the central processing unit to pull up a direct current level of the temperature protection signal in order to precisely control mode switch circuit.

7. The dual-mode charger circuit as claimed in claim 1, further comprising:
   a fourth resistor; and
   a fifth resistor connected with the fourth resistor in series between the power source and the mode switch circuit, to divide a voltage of the power source;
   wherein a junction of the fourth resistor and the fifth resistor is connected to the central processing unit to pull up a direct current level of the mode control signal in order to precisely control mode switch circuit.

8. A dual-mode charger circuit to charge a battery, comprising:
   a first charge circuit connected between a power source and the battery, to provide a first charge path;
   a second charge circuit connected in parallel with the first charge circuit, to provide a second charge path;
   a central processing unit connected to the battery, to detect a capacity of the battery and determine whether the detected capacity exceeds a predetermined capacity, and to output a mode control signal according to the determination; and
   a mode switch circuit connected between the central processing unit and the second charger circuit, to switch the second charger circuit on/off according to the mode control signal; and
   a temperature detection circuit connected to the central processing unit, to detect a temperature of the battery and output the result to the central processing unit, wherein the central processing unit outputs a temperature protection signal according to the detected temperature;
   wherein when the mode switch circuit switches the second charge circuit off, the battery is charged only through the first charge path under a slow charge mode of the dual-mode charger circuit, and when the mode switch circuit switches the second charge circuit on, the battery is charged through both the first charge path and the second charge path under a quick charge mode of the dual-mode charger circuit.

9. The dual-mode charger circuit as claimed in claim 8, wherein the temperature protection circuit comprises:
   a third resistor; and
   a temperature detection resistor connected with the third resistor in series between another power source and ground and disposed close to the battery, to detect the temperature of the battery;
   wherein a junction of the third resistor and the temperature detection resistor is connected to the central processing unit.

10. The dual-mode charger circuit as claimed in claim 8, further comprising:
   a fourth resistor; and
   a fifth resistor connected with the fourth resistor in series between the power source and the mode switch circuit, to divide a voltage of the power source;
   wherein a junction of the fourth resistor and the fifth resistor is connected to the central processing unit to pull up a direct current level of the temperature protection signal in order to precisely control mode switch circuit.

* * * * *